United States Patent
Moran et al.

(10) Patent No.: US 6,222,952 B1
(45) Date of Patent: Apr. 24, 2001

(54) OPTICAL FIBER TRANSDUCER

(75) Inventors: Christopher Raymond Moran, Glasgow; Walter Craig Michie, Clarkston, both of (GB)

(73) Assignee: University of Strathclyde, Glasgow (GB)

(*) Notice: Subject to any disclaimer, the term of this patent is extended or adjusted under 35 U.S.C. 154(b) by 0 days.

(21) Appl. No.: 09/355,399

(22) PCT Filed: Jan. 30, 1998

(86) PCT No.: PCT/GB98/00296

§ 371 Date: Sep. 29, 1999

§ 102(e) Date: Sep. 29, 1999

(87) PCT Pub. No.: WO98/34083

PCT Pub. Date: Aug. 6, 1998

(30) Foreign Application Priority Data

Feb. 1, 1997 (GB) .................................................. 9702703

(51) Int. Cl.⁷ ........................................................ G02B 6/26
(52) U.S. Cl. .................................... 385/15; 385/16; 385/4; 385/13
(58) Field of Search .................................. 385/15, 16, 4, 385/13; 250/227.14, 227.16

(56) References Cited

U.S. PATENT DOCUMENTS

| | | | |
|---|---|---|---|
| 4,725,124 | * 2/1988 | Taylor | 385/13 |
| 4,729,630 | * 3/1988 | Martinez | 385/4 |
| 4,789,241 | * 12/1988 | Michal et al. | 356/350 |
| 5,093,569 | 3/1992 | Krumboltz et al. . | |

* cited by examiner

Primary Examiner—Cassandra Spyrou
Assistant Examiner—Mohammad Y. Sikder
(74) Attorney, Agent, or Firm—Alston & Bird LLP

(57) ABSTRACT

A measurand is detected by a sensor element forming part of a transducer unit which is filled to an optical fiber or fiber capable such that the fiber is bent or curved to an abnormal level which introduces a measurable loss in the transmission characteristics of the fiber. The transducer unit has three spaced clamp members arranged to be clamped along the length of the fiber. The sensor element is fitted between clamp members and the fiber is guided over a bar located between clamp members.

7 Claims, 1 Drawing Sheet

100
OPTICAL FIBER TRANSDUCER

FIELD OF THE INVENTION

This invention relates to detection of a measurand utilising a transducer unit in association with an optical fibre or optical fibre cable.

According to a first aspect the present invention provides a transducer unit adapted to be fitted to an optical fibre, the transducer unit comprising a support structure carrying an assembly of clamp members mutually spaced from one another in a generally linear direction, the clamp members being adapted and arranged to be secured individually to an optical fibre extending in said direction, obstructive means disposed in the path of the optical fibres between first and second clamp members of the assembly for pre-bending the fibre from its lenear path when the fibre is clamped, a sensor element which is sensitive to a particular measurand disposed between at least one of the first and second clamp members and another clamp member of the assembly, the sensor element being such that in operation exposure to the particular measurand causes a dimensional change of the sensor element in said linear direction, the arrangement of the transducer unit being such that the magnitude of the bend in the fibre is enlarged to an abnormal level which introduces a measurable loss in the transmission characteristics of the fibre when the sensor element is exposed to the particular measurand.

SUMMARY OF THE INVENTION

The sensor element may be of the type which dimensionally enlarges or dimensionally contracts in said linear direction. Such sensor elements may be made of hydrogel material or shape memory alloy material. Dimensionally contracting sensor elements are disposed between the first and second clamp members.

The sensor element is preferably made of a material where the dimensional change is reversible on removal from exposure to the particular measurand. Such sensor elements are preferably secured at each end to at least one of the first and second clamp members and to the said another clamp member of the assembly.

The sensor element may be in the form of a hydrogel plug for sensing aqueous environments such as the presence of water or water vapour or pH value. It may be a rubber plug for sensing hydrocarbon presence. It may be a swellable wax plug for sensing heat or it may be a shape-memory-alloy element such as a spring for sensing heat. It will of course be recognised that the foregoing materials are given only by way of example of the many materials which are suitable to form the sensor elements.

In one embodiment the assembly of clamp members are three in number and have limited movement with respect to the support structure and are arranged so as to be mutually separated by respective distances each of which is less than the length of the corresponding fibre portion when the clamp members are secured to be fibre. The sensor element is disposed between the second and third clamp members. In this way when the sensor element is of the type which becomes enlarged on exposure to the particular measurand it causes movement of the second or central clamp member without being restrained by the presence of a comparatively rigid portion of fibre between the first and second clamp members.

It is preferred that a resilient biasing element is located between the first and second clamp members for restoring the position of the central or second clamp member after activation of the sensor element and in the absence of the particular measurand.

The optical fibre is preferably a single mode fibre or a bundle of single mode fibres forming a fibre cable. In this connection it will be understood that the integrity of the optical fibre does not require to be compromised by use of the transducer unit in that there is no stripping of fibre cladding or overcovering or the like.

The condition of the optical fibre and the transducer unit associated therewith may be interrogated by transmission of a signal along the length of the fibre and which is detected at the fibre output and by a power threshold detection unit. Alternatively a detection system which uses optical time domain reflectometry (OTDR) may be used to locate the position of a transducer unit incorporating an abnormally bent fibre. This is of particular value where several transducer units are fitted along the length of the optical fibre. Several different types of sensor elements can be used in transducer units along the length of the same cable in order to detect different measurands. The loss characteristics can be tuned so that different sensor types have different loss signatures on activation thereby enabling detection of different measurands to be prioritised.

BRIEF DESCRIPTION OF THE DRAWINGS

An embodiment of the present invention will now be described with reference to the accompanying schematic drawings, in which.

DETAILED DESCRIPTION OF THE INVENTION

Figure 1:
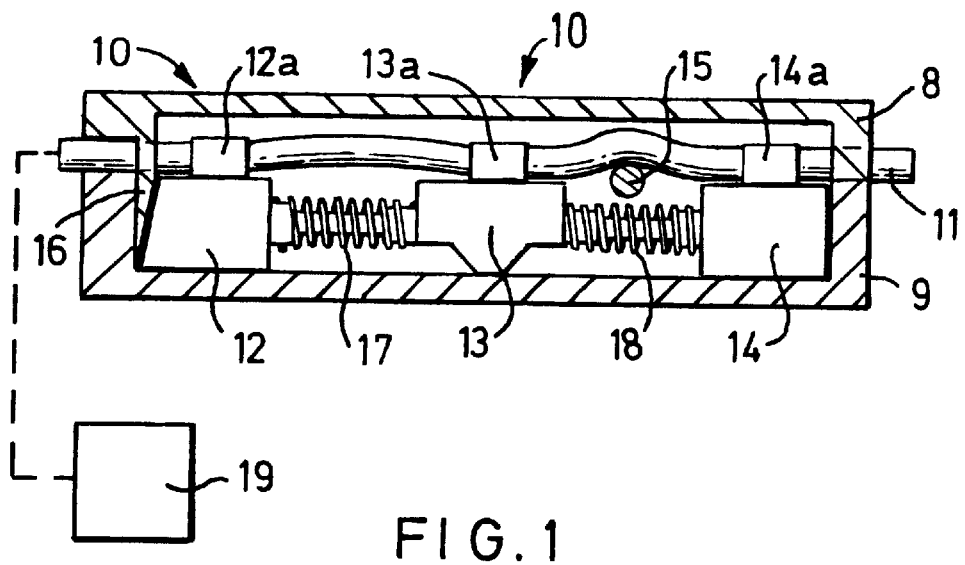
FIG. 1 is a sectional side view of a transducer unit in accordance with the present invention when fitted to an optical fibre.
Figure 2:
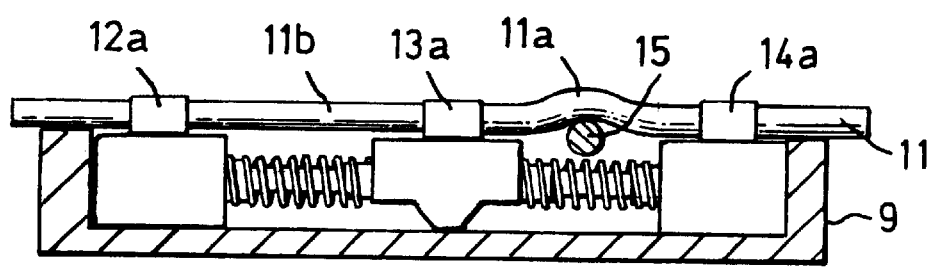
FIG. 2 is similar to FIG. 1 but with components removed in the interests of clarity.
Figure 3:
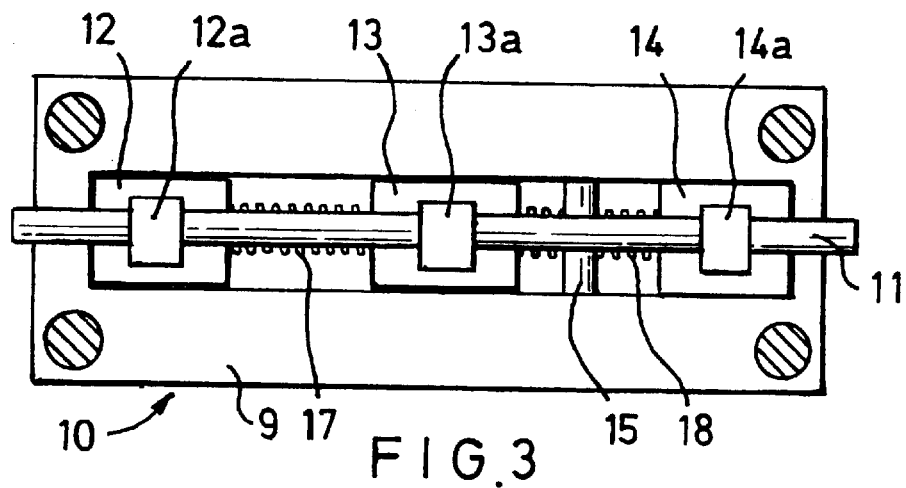
FIG. 3 is a plan view of FIG. 2.

The transducer unit 10 illustrated in the drawings has a box-like support structure which is capable of being fitted to an optical fibre 11 with minimal disturbance of the fibre. Unit 10 has a base portion 9 which internally houses a set or assembly of three clamp members 12, 13, 14 which are mutually spaced from one another in a generally linear direction, being the direction of the fibre 11. The clamp members 12, 13, 14 respectively include releasable clamp elements 12A, 13A, 14A which can be retrofitted to clamp against the outer surface of the fibre 11. Extending transversely with respect to the fibre direction, and between clamp members 13 and 14, there is an obstructive member 15 which projects into the path of the fibre 11 for pre-bending the fibre out of its strictly linear path. The obstructive member 15 conveniently is in the form of a rod secured to the walls of the base 9.

Clamp member 12 is capable of limited movement towards clamp member 13 and the latter is also capable of limited movement towards clamp member 14. Clamp member 14, however, is effectively rigidly secured. An overfill feed wedge 16 is provided as part of a lid portion 8 of the unit 10 to adjust the position of clamp member 12 after it is clamped to the fibre 11 so as to introduce an excess of fibre between clamp members 12 and 13 as a result of which the fibre does not extend strictly linearly in that portion.

A sensor element 17 which is sensitive to a particular measurand and dimensionally enlarges as a consequence is disposed between the clamp members 12 and 13. In the illustrated embodiment this sensor element is in the form of a coil spring made of shape memory alloy (eg nitinol). As the temperature of the environment surrounding the spring 17 rises above a trigger threshold level the nitinol goes through a phase transition and the spring attempts to return to its pre-determined shape which is of greater axial length than is illustrated in FIG. 1. During this recovery process the spring releases large amounts of energy and is sufficient to move clamp member 13 in the direction of clamp member 14 at least to a limited extent. This movement causes buckling of the fibre portion overlying the obstructive member 15 and this buckling constitutes an abnormal bend which introduces a measurable loss in the transmission characteristics of the fibre 11 at the location of the transducer unit 10.

Once the temperature of the spring sensor element 17 returns to normal the sensor element 17 can be restored to its FIG. 1 condition and this is achieved by the provision of a resilient biasing member 18 which conveniently is in the form of a stainless steel coil spring located between the clamp elements 13 and 14. Coil springs 17 and 18 conveniently surround rod elements which ensure that the springs retain their coil shape.

It will be understood that the fibre 11 is associated with a detection system 19 which enables the presence of an abnormally bent fibre 11 to be identified. Detection unit 19 is preferably an optical time domain reflectometry system which provides a pulse or series of pulses to the fibre 11 and detects pulse reflections from abnormally bent fibre portions and is thereby able to locate the position of the abnormally bent fibre portions.

It will be understood that the transducer unit 10 can be attached anywhere along the length of an optical fibre or optical fibre cable. It will also be appreciated that the various clamp members may take any individual format and for example it may not be necessary for the unit 10 to incorporate a lid. It could be an open housing. Furthermore the overfill feed element 16 may itself form a clamp element so that it may be integrated with clamp element 12A.

When the transducer unit 10 is fitted to the fibre 11 fibre portion 11A which extends between clamp elements 13A and 14A is deflected from its strictly linear condition by the obstructive member or rod 15. Accordingly when clamp member 13 is moved by the sensor element 17 in the direction of the clamp member 14 there is minimal resistance to further bending of the fibre 11 imposed by the fibre itself because it already incorporates a bend. Likewise clamp member 12 is initially fitted and clamped to the fibre 11 but thereafter the overfill feed element 16 is applied and this causes movement of the member 12 towards clamp member 13 which initial movement causes a minor deflection of the fibre portion 11B which lies between clamp members 12 and 13. Accordingly when the sensor element 17 expands the fibre portion 11B imposes no restraint on movement of the clamp member 13. Clamp member 12 is effectively fixed as is clamp member 14.

It will be understood that the transducer unit disclosed herein is electrically passive and immune to electromagnetic interference and is virtually maintenance free and can be retrofitted to the fibre 11.

What is claimed is:

1. A transducer unit adapted to be fitted to an optical fibre, the transducer unit comprising a support structure carrying an assembly of clamp members mutually spaced from one another in a generally linear direction, the clamp members being adapted and arranged to be secured individually to an optical fibre extending in said direction, obstructive means disposed in the path of the optical fibre between first and second clamp members of the assembly for pre-bending of the fibre from its linear path when the fibre is clamped, a sensor element which is sensitive to a particular measurand disposed between at least one of the first and second clamp members and another clamp member of the assembly, the sensor element being such that in operation exposure to the particular measurand causes a dimensional change of the sensor element in said linear direction, the arrangement of the transducer unit being such that the magnitude of the bend in the fibre is enlarged to an abnormal level which introduces a measurable loss in transmission characteristics of the fibre when the sensor element is exposed to the particular measurand.

2. A transducer unit as claimed in claim 1, wherein the sensor element is made of a material where the dimensional change is reversible on removal from exposure to the particular measurand, and the sensor element is secured at each end to a least one of the first and second clamp members and to the said another clamp member of the assembly.

3. A transducer unit as claimed in claim 1, wherein a resilient biasing element is located between the first and second clamp members for restoring the position of the central or second clamp member after activation of the sensor element and in the absence of the particular measurand.

4. A transducer unit as claimed in claim 1, wherein the assembly has three clamp members each of which has limited movement with respect to the support structure and the three clamp members are arranged so as to be mutually separated by respective distances each of which is less than the length of the corresponding fibre portion when the clamp members are secured to the fibre.

5. a transducer unit as claimed in claim 1, where the sensor element is any one of:

a) a hydrogel plug for sensing aqueous environments;
b) a rubber plug for sensing hydrocarbon presence;
c) a wax plug for sensing heat;
d) a shape-memory-alloy element for sensing heat.

6. A transducer unit as claimed in claim 1, including a detection system which enables the presence of an abnormally bent fibre to be identified.

7. A method of detecting presence of a plurality of measurands; comprising providing a length of optical fibre having a detection system which enables the presence of an abnormally bent fibre to be identified, and fitting several transducer units along the length of the fibre, wherein each transducer unit is as claimed in any one of claims 1–4, and wherein several different types of sensor elements are used in the transducer units, the different types of sensor elements being sensitive to respective measurands.

* * * * *